Feb. 7, 1967 D. JUST 3,303,109
PROCESS FOR THE DETERMINATION OF DIFFUSION PROFILES
IN SEMICONDUCTOR BODIES
Filed April 11, 1963

*INVENTOR.*
DIETER JUST
BY
ATTORNEY

United States Patent Office

3,303,109
Patented Feb. 7, 1967

3,303,109
PROCESS FOR THE DETERMINATION OF DIFFUSION PROFILES IN SEMICONDUCTOR BODIES
Dieter Just, Freiburg im Breisgau, Germany, assignor, by mesne assignments, to International Telephone and Telegraph Corporation, New York, N.Y., a corporation of Maryland
Filed Apr. 11, 1963, Ser. No. 272,433
Claims priority, application Germany, Apr. 28, 1962, J 21,694
1 Claim. (Cl. 204—1)

This invention relates to a process for determining diffusion profiles in semiconductor bodies in which by inward diffusion of a suitable impurity material a layer of different conductivity-type has been produced.

Heretofore, the concentration distribution of foreign atoms diffused into a semiconductor body from the gas phase has been determined by a process known as the layer technique. In general this process consists of the removal of successive body layers starting from the surface of the solid with analysis of the removed layers or the surface of the semiconductor body after each layer removal. The layer technique and other similar processes thus involves a multitude of costly time consuming steps and can only be carried out with the expenditure of a great amount of time.

It is a principal object of this invention to provide an improved method of determining diffusion profiles in semiconductor bodies.

Another object of the invention is to remove material from a semiconductor body and simultaneously measure properties which are related to the concentration of foreign atoms.

According to the invention the semiconductor body is dipped into a suitable corrosion medium and the corrosion potential is measured as a function of corrosion time. By utilizing known relations the concentration of impurities is determined from the corrosion potential and the layer thickness removed is determined from the corrosion time so that the concentration of impurities at a particular diffusion depth can be represented directly.

Other objects and advantages will become apparent from the following description taken in connection with the accompanying drawings wherein.

In general, the invention makes use of studies of the corrosion process in germanium which are described by Gerischer and Beck in the "Zeitschrift fur physikalische Chemie," NF 23, 113 (1960), by Brattain and Barrett in the "Bell System Technical Journal," 34, 129 (1955), and by Turner in the "Journal of the Electrochemical Society," 103, 252 (1956).

These studies have shown that corrosion speed of p and n germanium is determined by the addition of the oxidation agent in the corrosion medium to the phase boundaries. In p endowed germanium the corrosion potential is established independently of the endowment with foreign atoms. Contrary to this, the corrosion potential of n-conductive germanium is proportional to the logarithm of the effective electron concentration. Use is made in the present invention of these results supported also by theoretic laws in order to determine the diffusion profile, particularly in n-conductive germanium.

Figure 1:
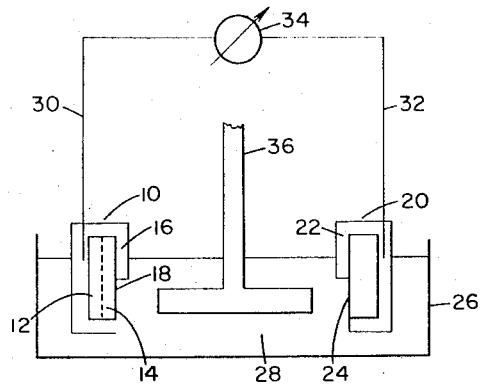
FIGURE 1 is a schematic illustration of a measuring system for carrying out the process according to the invention.

Referring now specifically to FIGURE 1 of the drawings there is shown a typical germanium plate 10 with respect to which the process embodying the invention will be described. Plate 10 comprises, for example, a p endowed germanium layer 12 into the surface of which an impurity such an antimony is diffused to produce an n-conductive layer 14. The plate 10 is additionally provided with a covering 16 of insulating material such as Pizein (pitch) which is applied around the plate 10 so as to leave a small surface 18 of the n-conductive layer 14 exposed to a corrosion medium as will hereinafter be described.

Similarly, a second germanium plate 20 consisting of only p-conductive germanium is provided with an insulating covering 22 applied so as to leave a small surface 24 exposed to the corrosion medium.

The germanium plates 10 and 20 so prepared are positioned in a container 26, containing a suitable corrosion medium 28, and utilized as electrodes in an electrolyte. By means of coverings 16 and 22 only surfaces 14 and 24 are exposed to the corrosion medium and electrolyte. While the exposed surfaces 14 and 24 may be variously sized it has been found that exposed surfaces 14 and 24 of approximately four square millimeters are sufficient for practice of the invention. The corrosion medium 28 may comprise various compositions. Good results have been obtained with a solution consisting of 0.1 N NaOH, 1 N NaNO$_3$ and 0.02 M K$_3$(Fe(CN)$_6$).

The electrodes formed by plates 10 and 20 are connected by conductors 30, and 32, respectively, to a measuring instrument 34 which manifests the corrosion potential. Specifically, conductor 30 is electrically connected to the p-conductive layer 12 of plate 10, and conductor 32 is electrically connected to plate 20 as shown schematically in FIGURE 1. Measuring instrument 34 may take the form of a compensating recorder which continuously indicates and records the potential difference between plates 10 and 20 as a function of the corrosion time.

It is advisable to agitate or to move the corrosion medium during the measuring process and to this end an agitator 36 is rotated at a constant speed such as by an electric motor (not shown). Also the concentration of of oxidant is preferably maintained constant during the measuring process. To eliminate the possibility of disturbing photo effects the container 26 may be enclosed or shielded by suitable means (not shown) to protect the electrodes defined by plates 10 and 20 from the action of direct light.

With the plates 10 and 20 positioned in the container 26 and the circuitry established as shown in FIGURE 1, chemical dissolution or corrosion will occur causing material to be removed from exposed surface 18 of the n-conductive layer 14. The p-conductive material of the electrode defined by plate 20 will not undergo corrosion or chemical dissolution and establishes a constant reference potential. Measuring instrument or recorder 34 accordingly continuously functions to provide a record of the corrosion potential $U_K$ which is the potential difference between plates 10 and 20 as a function of the corrosion time $t_K$.

Figure 2:
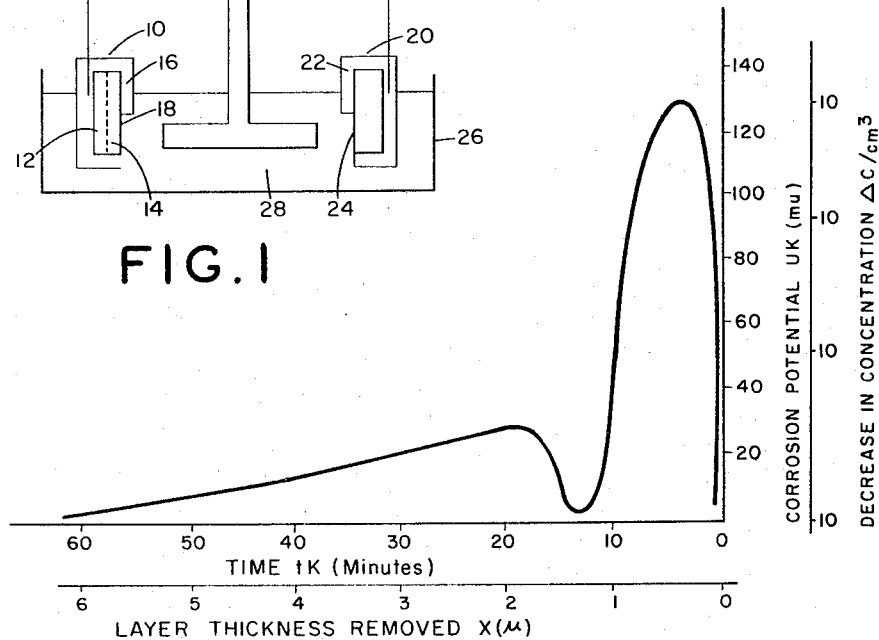
FIGURES 2, 3 and 4 are diffusion profiles determined in accordance with the invention.

It will be apparent to those skilled in the art that through utilization of a strip chart recorder a graph of corrosion potential $U_K$ (ordinate) as a function of corrosion time $t_K$ (abscissa) as illustrated in FIGURE 2 can be directly and continuously plotted during the corrosion process to provide a permanent record of the measured variable.

For quantitative evaluation of the measured changes in corrosion potential $U_K$ as a function of corrosion time $t_K$ a relationship is established between corrosion potential and impurity concentration C per cubic centimeter and between the corrosion time and the layer thickness X removed in microns from the n-conductive layer 14. With respect to n endowed germanium the relationship between corrosion potential $U_K$ and the impurity concentration C is determined by utilizing a known logarithmic dependence. On the basis of this relationship an ordinate scale for decrease in impurity concentration per cubic centimeter ($\Delta C/cm.^3$) correlated to the corrosion potential $U_K$ in millivolts as shown in FIGURE 2 may be established to provide a direct indication of the change in impurity concentration.

There is additionally a known relationship between corrosion time $t_K$ and layer thickness X removed with a given concentration of oxidant in the corrosion medium and a constant stirring speed during the corrosion process. On the basis of this relationship an abscissa scale for layer thickness X removed correlated to time $t_K$ as shown in FIGURE 2 is provided to furnish a direct indication of layer thickness X. Since the distance of the pn-junction from the surface 18 at the beginning of the measurement is determinable by known methods the abscissa scale thus obtained is representative also of the depth of the n-conductive layer remaining and thus identifies the place in the total layer depth corresponding to a particular impurity concentration.

In the manner described a record of corrosion potential $U_K$ as a function of the corrosion time $t_K$ is utilized to determine directly impurity concentration at certain diffusion depths.

Figure 3:
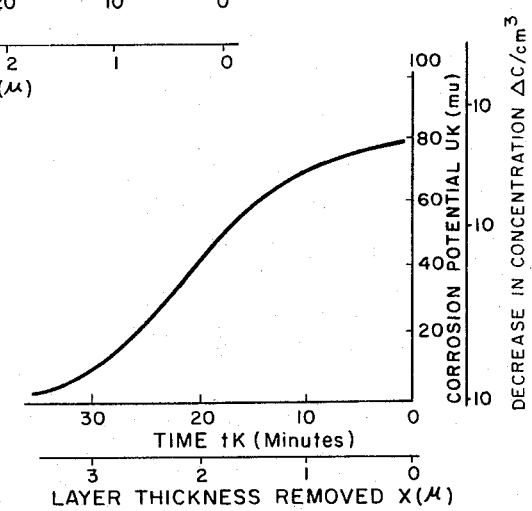
Figure 4:
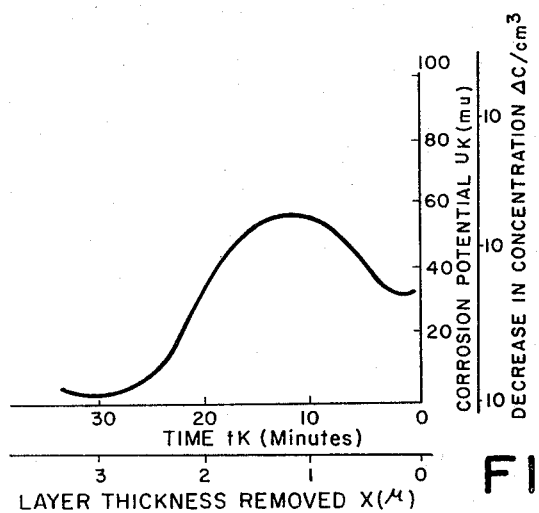

In FIGURES 3 and 4 are shown additional diffusion profile curves determined in accordance with the invention. Similar to FIGURE 2 the profile curve is obtained by recording corrosion potential $U_K$ in millivolts as a function of time $t_K$ in minutes. Below each abscissa is a scale layer thickness X removed in microns. Similarly, beside each ordinate is a scale indicating the decrease in impurity concentration.

The process according to the invention makes it possible to measure diffusion profiles in a few minutes without substantial expenditures of time and money. In particular, the process is suitable for rapid comparison of various concentration distributions of the endowing substance resulting from changed boundary conditions in the diffusion. Even the knowledge of the nature of the profile (steepness, plateau near the surface, maximum within the crystal) is in many cases an important criteria for predicting the suitability of diffused semiconductor crystals for the production of certain electronic parts.

Additionally, it is also possible to influence as desired certain properties of semiconductor bodies with the aid of the process according to the invention. For example, in the production of transistors there is often the problem of influencing the base path resistance without increasing the surface concentration or changing the diffusion depth. With the process according to the invention, however, it was possible, for example, by suitable change in the temperature condition during the diffusion process, to change the diffusion profile so that the base path resistance was reduced from 100 ohms to 35 ohms in a semiconductor sample. By utilizing the process in accordance with the invention the separate diffusion processes could be controlled. In this way it is possible within a short time after diffusion ends to take the curve of concentration distribution and to use the knowledge so obtained in the next diffusion process. The processes heretofore used consume much more time and often produce inaccurate data since they produce a measurement in points only.

A problem often arising in the manufacture of semiconductor devices having diffused layers is the achievement of a certain concentration of impurities at the surface. In this case, also, the process according to the invention can be used advantageously to determine diffusion profiles and to achieve the desired concentration. More particularly, it can be determined in advance from the known relation between the corrosion potential and the concentration of impurities, the value of the corrosion potential at which the desired concentration of impurities exists. When this value is reached in the etching process the etching is terminated automatically by removing the semiconductor body by means of a suitable device, which is coupled with a measuring instrument, upon reaching a prescribed corrosion potential, and then rinsing the semiconductor body.

It will be apparent that the invention may also be utilized in connection with semiconductor bodies of silicon in the same manner as described in connection with the n-conductive germanium semiconductor layer. Studies of the dependence of corrosion potential on the endowing of the silicon have been described by D. R. Turner in "Journal of the Electrochemical Society" 1960, pp. 107, 810. In this instance a corrosion medium such as a solution of 6.6 M $HNO_3$ and 1.7 M HF is suitable. This solution is sufficient for a measurement of the concentration distribution of the impurity material in n-silicon and in p-silicon and in accordance with applicant's invention a counter electrode may be used comprising, for example, highly endowed p-silicon.

It will be apparent that in carrying out the process disclosed herein it is not necessary to utilize a counter electrode comprising p endowed semiconductor material. A counter electrode which is not attacked by the corrosion medium and thus having a constant reference potential will suffice.

It will be apparent to those skilled in the art that many changes may be made in the process disclosed herein without departing from the scope of the invention as defined in the appended claim.

It is claimed and desired to secure by Letters Patent of the United States:

A process for determining impurity diffusion profiles in semiconductor bodies selected from the group consisting of germanium and silicon having an n-conductive layer produced by diffusion of a suitable impurity, comprising the steps of: covering the surface of the semiconductor body to leave a small area of the n-conductive layer surface exposed; inserting the body as an electrode in a corrosion medium which effects removal of the exposed layer surface by corrosion; inserting a reference electrode comprising p-conductive semiconductor material in the corrosion medium which is not attacked by the corrosion medium; continuously measuring the potential difference between the electrodes during the corrosion process; and recording the potential difference as a function of time on a graph having a concentration scale correlated to corrosion potential and a scale representative of layer thickness removed correlated to corrosion time.

References Cited by the Examiner

UNITED STATES PATENTS 3,024,179   3/1962   Sanders _____ 204—143
3,214,354   10/1965  Capuano et al. _____ 204—1

OTHER REFERENCES

Flynn: "J. of Electrochemical Soc.," vol. 105, 1958, pp. 715—718.

Gerischer et al.: "Zeitschrift fur Physikalische Chemie," N. F. BD 23–24, 1960, pp. 113–123.

Gobrecht et al.: "Zeitschrift fur Electrochemie," vol. 63, 1959, pp. 541–550.

Turner: "J. of Electrochemical Soc.," vol. 103, 1956, pp. 252–256.

Turner: "J. of Electrochemical Soc.," vol. 107, 1960, pp. 810–816.

JOHN H. MACK, *Primary Examiner.*

T. H. TUNG, *Assistant Examiner.*